United States Patent Office 2,819,314
Patented Jan. 7, 1958

2,819,314

PRODUCTION OF VITAMIN A AND RELATED COMPOUNDS

William Oroshnik, Plainfield, N. J., assignor to Ortho Pharmaceutical Corporation, a corporation of New Jersey No Drawing. Application April 20, 1953
Serial No. 349,969

11 Claims. (Cl. 260—611)

This invention relates to compositions of matter and to methods for preparing the same. This invention particularly relates to compounds which are derivatives of α-ethynyl-β-ionol and to methods of preparing the said derivatives.

It is an object of this invention to prepare compounds having the same number of carbon atoms and the same configuration with respect to carbon atoms as vitamin A ethers.

It is another object of this invention to prepare hydroxy compounds having the same number of carbon atoms and the same configuration with respect to carbon atoms as vitamin A ethers.

It is still another object of this invention to prepare a hydroxy compound having the same number of carbon atoms and the same configuration with respect to carbon atoms as vitamin A or a vitamin A ether which has vitamin A activity and marked stability to oxidation.

It is another and further object of this invention to prepare compounds having the same number of carbon atoms and the same configuration with respect to carbon atoms as vitamin A ethers and the same number of hydrogen atoms as vitamin A ethers.

It is another object of this invention to prepare compounds having vitamin A activity.

Other objects of this invention will be apparent from the description following and from the appended claims.

In the "Journal of the American Chemical Society," volume 67, page 1627 (1945), the inventor disclosed that certain derivative of α-ethynyl-β-ionol have value as intermediates in the preparation of synthetic compounds having vitamin A activity. This publication disclosed that a compound having the following formula

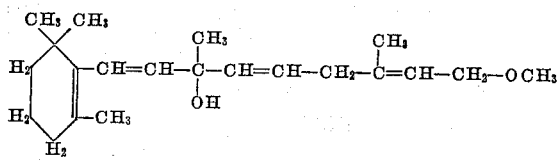

could be prepared by catalytic reduction of an acetylenic compound prepared by reacting α-ethynyl-β-ionol with a Grignard reagent and an ether of a 1,4 chlorohydrin of isoprene according to the following equation:

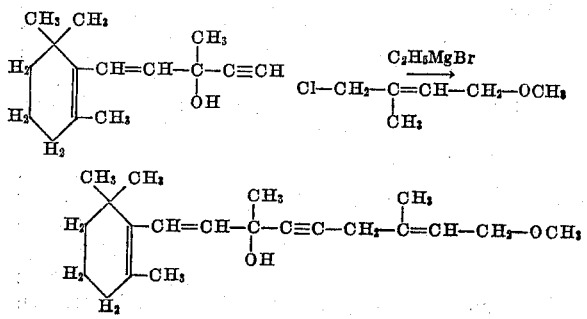

The acetylenic compound could not be distilled without dehydration because of impurities which were present. The reduction product of the acetylenic compound could be converted to a compound having vitamin A activity by a simultaneous rearrangement and dehydration.

It has now been discovered that compounds having vitamin A activity may be prepared from a compound having the formula

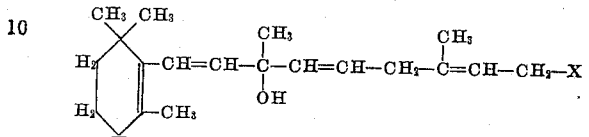

Compound I wherein X is —OR or

—O$\overset{\text{O}}{\underset{}{\overset{\|}{\text{C}}}}$R and R is a lower alkyl radical.

The preparation and properties of compound I are given by William Oroshnik, G. Karmas, and A. D. Mebane, Journal of the American Chemical Society, volume 74, page 295 (1952).

In the practice of this invention compound I, in which X is —OR, is isomerized by treatment with a strongly alkaline substance such as sodium or potassium hydroxide, a sodium or potassium alkoxide in alcohol, or a quaternary ammonium hydroxide, and the product of the isomerization has the formula

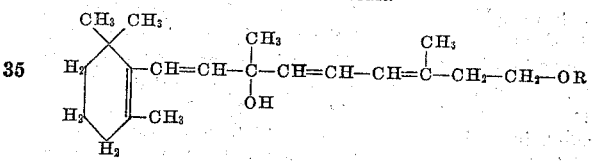

Compound II wherein R has the same significance as above.
When X of compound I is

—O$\overset{\text{O}}{\underset{}{\overset{\|}{\text{C}}}}$R alkali treatment saponifies the ester linkage and the product is in the form of an alcohol. Compound II is stable in the absence of acidic substances and has vitamin A activity whether resulting from alkali treatment of compound I in the ether or ester form.

Compound II, in the ether or alcohol form, may be simultaneously allylically rearranged and dehydrated to produce vitamin A.

The allylic rearrangement probably results in an intermediate compound having the formula

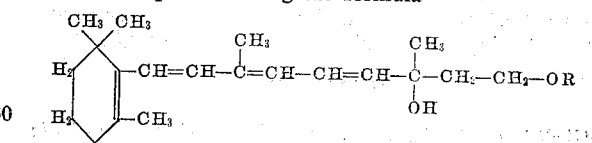

as well as an intermediate compound having the formula

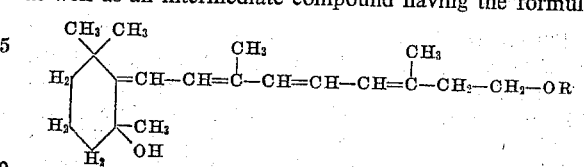

wherein R is a lower alkyl radical or hydrogen. Dehydration of the first of these rearrangement products results in vitamin A and dehydration of the second results in retrovitamin A.

Suitable dehydrating agents include an acid chloride in an organic base and specifically benzoyl chloride in pyridine and acetyl chloride in dimethylaniline, glacial acetic acid, glacial acetic acid and potassium acetate, and aqueous acetic acid; dehydration with the above reagents being accomplished at room temperature. Other dehydration reagents found suitable include toluene sulfonic acid in benzene, oxalic acid in benzene, glacial acetic acid in benzene, catalytic quantities of iodine in benzene, and phenyl isocyanate in benzene; dehydration with these reagents being accomplished at the boiling temperature of benzene. When X in compound I is —OR, the dehydration may be accomplished by heating in the presence of excess Grignard reagent in benzene at the boiling point of benzene or in a mixture of xylene and ether at a temperature of 55° C. to 60° C.

The following examples are given merely to illustrate specific ways in which the invention may be practiced, and it is to be understood that the invention is not to be restricted or limited thereby.

EXAMPLE I

*Alkali isomerization of compound I (methoxy) to obtain compound II (methoxy) by means of sodium methoxide*

134.8 grams of compound I (methoxy) were dissolved in 1750 cc. of methanol containing 316 grams of sodium methylate. The solution was heated under reflux for 7½ hours and then poured into a large excess of water, whereupon an oily material separated out. The oily material was extracted with petroleum ether, the petroleum ether was thoroughly washed with water, dried over anhydrous potassium carbonate, and the petroleum ether was then removed under vacuum. The residue was distilled at .001 mm. of mercury pressure; the entire material distilled at a temperature of from 105° C. to 115° C. and was separated into five fractions of which the first fraction weighed 14.6 grams and had a refractive index at 20° C. of 1.5178, the second fraction weighed 12.1 grams and had a refractive index at 20° C. of 1.5206, the third fraction weighed 9.1 grams and had a refractive index at 20° C. of 1.5206, the fourth fraction weighed 88.1 grams and had a refractive index at 20° C. of 1.5220, and the fifth fraction weighed 2.4 grams and had a refractive index at 20° C. of 1.5243. The fourth fraction represents the isomerized material in a pure state, and the ultraviolet spectrum of the fourth fraction showed an absorption band with a maximum at 2370 A. and a molecular coefficient of extinction at this wave length of 22,280. Fractions one, two and three represent mixtures of unisomerized and isomerized compound I (methoxy) in varying proportions.

The fourth fraction was found to contain 79.29% carbon and 10.77% hydrogen; the calculated value for carbon is 79.19% and for hydrogen is 10.76% for a substance having the formula of compound II (methoxy).

EXAMPLE II

*Alkali isomerization of compound I (methoxy) to obtain compound II (methoxy) by means of sodium hydroxide in alcohol*

120 grams of compound I (methoxy) were dissolved in 2,000 cc. of methanol containing 250 grams of dissolved sodium hydroxide. The solution was refluxed for 7½ hours, and the remainder of the procedure corresponded to the procedure of Example I. The distillate had the same physical properties as the distillate obtained in Example I, and carbon and hydrogen analysis agreed closely with the values found for Example I.

EXAMPLE III

*Dehydration of compound II (methoxy) with glacial acetic acid*

Five grams of compound II (methoxy) were dissolved in 50 cc. of glacial acetic acid containing 5 grams of dissolved anhydrous potassium acetate. The solution was stirred at room temperature under nitrogen and in the dark from 12 to 24 hours and then poured into a large volume of water, whereupon the oily material separated out; the oily material was extracted with petroleum ether, the petroleum ether was washed well with dilute alkali, dried with anhydrous potassium carbonate, and filtered; the petroleum ether was then removed under vacuum. The residue was distilled at .001 mm. of mercury pressure. After a small forerun of 0.3 gram was arbitrarily removed, the remaining distillate was collected between 110° C. and 135° C. The distillate was a viscous golden yellow liquid and had a refractive index at 20° C. of 1.603. The ultra-violet spectrum of the distillate showed an absorption band with three maxima, at 3320 A., 3470 A., and 3650 A., and molecular coefficients of extinction at these wave lengths of 23,964; 28,227; and 20,582 respectively. This product was fed to vitamin A deficient rats and demonstrated vitamin A activity. Results of a carbon and hydrogen analysis agreed closely with the theoretical values for vitamin A methyl ether.

EXAMPLE IV

*Dehydration of compound II (methoxy) by means of para-toluene sulfonic acid*

4.2 grams of compound II (methoxy) were dissolved in 100 cc. of benzene. Two milligrams of para-toluene sulfonic acid were then added, and the mixture was refluxed; within three minutes an abundance of water droplets separated out in the water separator which was attached to the reflux condenser. After approximately fifteen minutes no more water was collected; the amount of water present in the water separator indicated that dehydration was complete. The mixture was refluxed ten to fifteen minutes longer, cooled, washed with dilute alkali, dried over anhydrous potassium carbonate, filtered, and concentrated. The benzene was removed under vacuum. The residue was distilled at .002 mm. of mercury pressure and distilled completely leaving no residue. The distillate had an index of refraction at 20° C. of 1.618. The ultra-violet spectrum of the distillate showed an absorption band with three maxima: 3320 A., 3480 A., and 3670 A. with molecular coefficients of extinction at these wave lengths of 29,369; 33,143; and 24,687 respectively. When fed to vitamin A depleted rats, this product showed vitamin A activity. Results of carbon and hydrogen analysis agreed closely with the theoretical values for vitamin A methyl ether.

EXAMPLE V

*Dehydration of compound II (methoxy) by means of anhydrous oxalic acid*

Ten grams of compound II (methoxy) were dissolved in 200 cc. of benzene, and 300 milligrams of anhydrous oxalic acid were added. The mixture was refluxed with a water separator and after one hour the product appeared to be completely dehydrated as indicated in the marked decrease of water coming off. It was refluxed and the benzene solution was washed with dilute alkali and dried over anhydrous potassium carbonate, filtered, concentrated under vacuum, and distilled at one thousandths of one millimeter of mercury pressure. The product was a clear golden yellow liquid and had a refractive index at 20° C. of 1.62. The ultraviolet spectrum of this product showed an absorption band with maxima at 3320 A., 3480 A., 3670 A., and molecular coefficients of extinction at these wavelengths of 29,817; 32,040; and 23,028 respectively. Carbon and hydrogen values obtained by analysis corresponded closely to the theoretical values for carbon and hydrogen for a compound having the structure of compound II (methoxy). When fed to vitamin A deficient rats, this compound showed exactly the same effects as natural vitamin A.

EXAMPLE VI

*Dehydration of compound II (methoxy) in glacial acetic acid*

5.8 grams of compound II were dissolved in 50 cc. of glacial acetic acid at room temperature. The solution immediately turned deep orange amber in color. The flask was then flushed with nitrogen, stoppered tightly and allowed to stand at room temperature in the dark for twelve hours. The solution was poured into a large volume of water; the precipitated oil was extracted with petroleum ether (boiling point 30° C. to 60° C.). The petroleum ether solution was washed with water and dilute alkali, dried over anhydrous potassium carbonate, filtered, concentrated under vacuum, and distilled at one thousandth of a millimeter of mercury pressure. There were obtained 5 grams of material whose refractive index at 25° C. was 1.5723. The ultraviolet spectrum of this compound showed an absorption band with maxima at 3020 A., 3200 A., and 3320 A., and an inflection at 3460 A. Carbon and hydrogen values determined by analysis agreed closely to the corresponding theoretical values for vitamin A methyl ether.

EXAMPLE VII

*Dehydration of compound II (methoxy) by means of methyl magnesium iodide*

5.8 grams of compound II (methoxy) were dissolved in 100 cc. of dried xylene and 15 cc. of 2.0 normal methyl magnesium iodide were added. The solution turned black upon the addition of the first few drops, then on further addition of Grignard reagent the color gradually lightened with the appearance of a precipitate which appeared to be in a rather granular state. The temperature rose to 45° C. spontaneously. When the methyl magnesium iodide was completely added, the color was light amber. To this solution was added 50 cc. of dry ether and the mixture was refluxed at a temperature of 55° C. to 60° C. for three hours. The mixture was then cooled and excess ammonium acetate solution was added. The ether-xylene layer was separated, dried, filtered, and concentrated under vacuum. The residue was distilled at one thousandth of a millimeter of mercury pressure. The bulk of the product had a refractive index at 20° C. of 1.5872. The ultraviolet spectrum of the product showed an absorption band with a maximum at 3300 A. with inflections at 3020 A. and 3200 A. Carbon and hydrogen values found by analysis agreed closely with the corresponding values for vitamin A methyl ether.

This application is a continuation-in-part of my application Serial No. 777,862, filed October 3, 1947, now U. S. Patent No. 2,674,621.

What is claimed is:

1. The method comprising treating a compound of the following formula

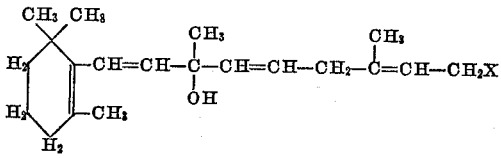

wherein X is selected from the group consisting of —OR and

and R is a lower alkyl radical, with a strongly alkaline reagent to provide a compound of the following formula,

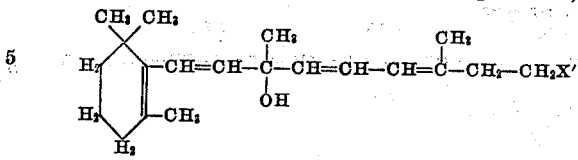

wherein X' is selected from the group consisting of —OR and —OH, and R is a lower alkyl radical.

2. A method according to claim 1 in which R is —CH₃.

3. A method according to claim 1 in which the strongly alkaline reagent is sodium methoxide in methyl alcohol.

4. A method according to claim 1 in which the strongly alkaline reagent is sodium hydroxide in ethyl alcohol.

5. The method comprising treating a compound having the following formula

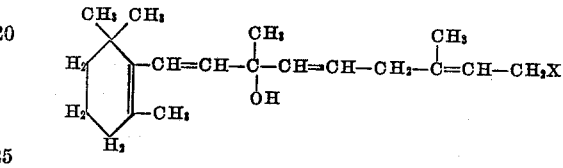

wherein X is selected from the group consisting of —OR and

and R is a lower alkyl radical, with a strongly alkaline reagent to provide a compound of the following formula

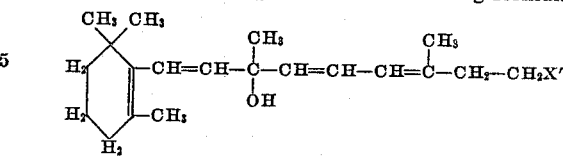

wherein X' is selected from the group consisting of —OR and —OH, and R is a lower alkyl radical, treating this compound with a dehydrating agent, whereby allylic rearrangement results in the formation of an intermediate compound of the formula

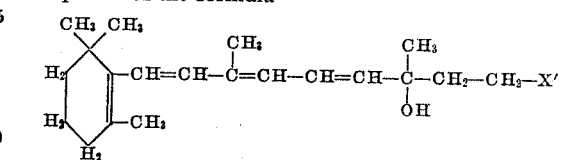

in which X' has the same significance as above, and dehydrating to produce a compound having the formula

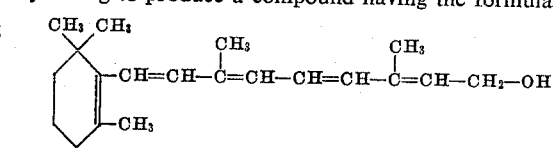

6. A method according to claim 5 in which R is —CH₃.

7. A method according to claim 5 in which the strongly alkaline reagent is sodium methoxide in methyl alcohol.

8. A method according to claim 5 in which the strongly alkaline reagent is sodium hydroxide in ethyl alcohol.

9. A novel compound of the formula

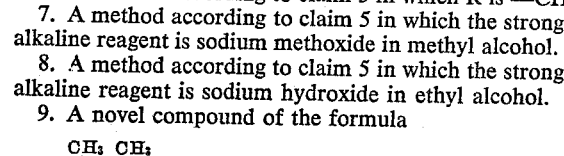

in which X' is selected from the group consisting of —OR and —OH, and R is a lower alkyl radical.

10. A novel compound of the formula
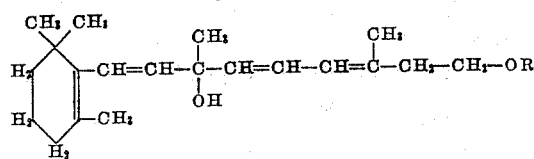
in which R is a lower alkyl radical.
11. A novel compound of the formula
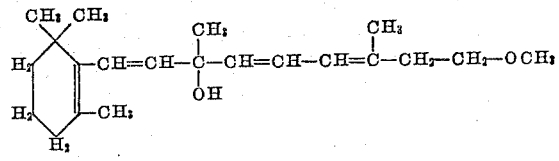
References Cited in the file of this patent
UNITED STATES PATENTS
2,602,092   Oroshnik _____ July 1, 1952